Sept. 14, 1965      W. M. SHWAYDER      3,205,841
ARMOR FOR STOPPING DRILLS AND THE LIKE
Filed June 5, 1961
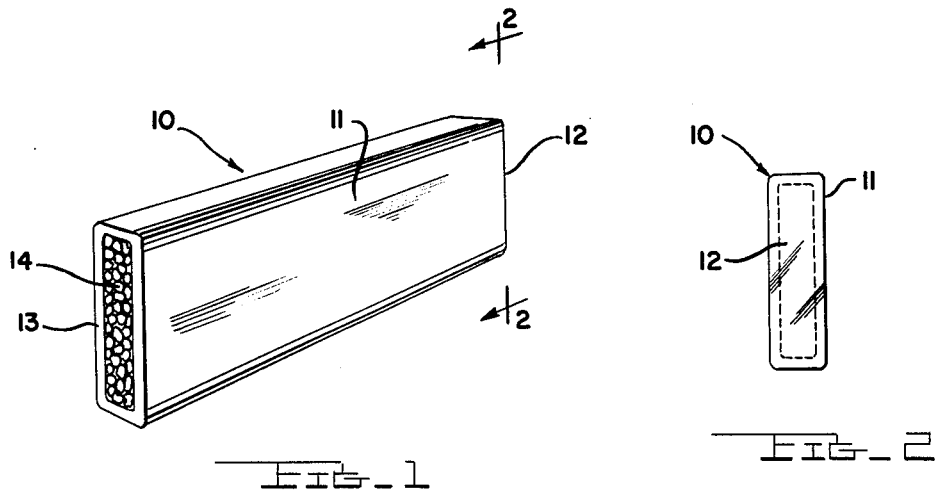
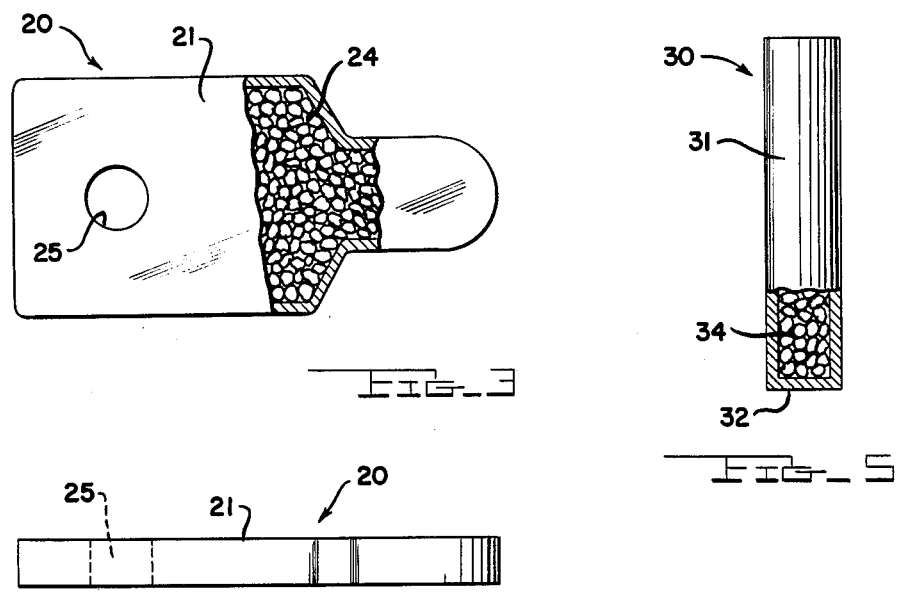
INVENTOR.
WARREN M. SHWAYDER
BY
Cullen & Cantor
ATTORNEYS

United States Patent Office 3,205,841
Patented Sept. 14, 1965

3,205,841
ARMOR FOR STOPPING DRILLS AND THE LIKE
Warren M. Shwayder, 684 E. Woodbridge, Detroit, Mich.
Filed June 5, 1961, Ser. No. 114,899
3 Claims. (Cl. 109—82)

This invention relates to armor for stopping drills and the like and more particularly to a drill proof metallic protector.

In the design and manufacture of safes, strong boxes and similar devices for storing valuables, it is desirable to reinforce the area where the lock is located and frequently other areas thereof in order to prevent safecrackers and the like from drilling holes into those areas and thus gaining access thereto. Safes particularly are designed with a reinforcement at the lock area since it is well-known that safecrackers frequently drill holes in the lock area and then by reaching in through the hole are frequently able to force the lock. However, the presently available reinforcing means while, in some cases, being capable of withstanding or slowing drilling for a short while are not capable of stopping drilling altogether and hence, a persistent safecracker can eventually drill through these reinforcing means.

Thus, it is an object of this invention to provide a drill proof armor means, which is so formed that it will withstand impacts, shocks and penetration.

A further object of this invention is to form a drill proof armor of an envelope of rigid, strong metal, such as steel, filled with a mixture of hard carbide particles, such as tungsten carbide, and brazing metal which will prevent penetration by drilling or by other cutting means.

Another object of this invention is to form an armor of an envelope filled with a mixture of tungsten carbide particles and brazing metal which may be formed in various shapes to protect predetermined areas where drilling is likely, such as in a flat plate shape which may be contoured or a cylindrical pin shape, etc.

These and other objects and advantages of this invention will become apparent upon reading the following description of which the attached drawings form a part.

In these drawings:

FIG. 1 is a perspective view of the armor formed in a flat bar-like shape.

FIG. 2 is an end view taken in the direction of arrows 2—2 of FIG. 1.

FIG. 3 is a plan view, partially in cross-section, of a shaped plate, and

FIG. 4 is an elevational view of the plate of FIG. 3.

FIG. 5 is an elevational view, partially in cross-section, of the armor formed as a cylinder or pin.

With reference to FIGS. 1 and 2, the armor, generally designated as 10, is formed of an envelope 11 which may be of a single flattened tube or may be fabricated out of separate parts formed of a rigid, strong metal, such as a high grade steel. The envelope has two opposing spaced apart, flat walls joined together by integral top and bottom walls and a closed end 12. The opposite end 13 may be left open or alternatively may be closed off as is the end 12.

The hollow interior of the envelope is filled with a filler matrix 13 formed of numerous, closely spaced, packed together particles of either solid tungsten carbide or cemented tungsten carbide along with a brazing material such as 10% nickel bronze or some such similar brazing compound. The brazing metal fills the voids between the particles and brazes the particles together, and, in addition brazes the particles to the interior wall surfaces of the envelope so that the filler is completely solid and completely brazed in place within the envelope and completely fills the envelope.

This armor may be secured in whatever place it is needed and will function as a means to stop drills and other types of cutting or impact tools. Since the steel envelope may be easily welded or bolted or otherwise secured into place without the need of cutting through the filler, attachment of the armor is particularly simple and inexpensive.

The armor is so made that a drill operated against it would, in due course, penetrate the envelope but when it strikes the filler, the drill will not go further. This filler will stop virtually every known drilling material except certain types of diamond drills and even then under certain special lubricating and handling conditions which are not available under conditions of safecracking or unlawful entry. Hence, the armor plate is virtually drill proof.

Although the filler material could be shattered by sharp impact or the particles could be broken out, bit by bit, the envelope protects against this and prevents shattering to a great degree and prevents the removal of the particles. Moreover, even if the filler was shattered by sufficient impact, it still would retain its shape within the envelope and prevent drilling therethrough.

The armor may be formed in different shapes for different purposes, such as shown in FIG. 3 where the armor 20 is formed as a paddle-like shape with its envelope 21 contoured for particular use such as fitting behind the lock of a safe. It is provided with a hole 25 prior to placing the filler therein so that a handle or safe lock portion can fit through. Here, the filler 24 is formed of the same material as that mentioned above.

In both cases, the envelope is first formed and then the filler material is poured in through the open end and is solidified in place within the envelope. The open end may then be closed off if desired or may be left open.

The armor may be also formed in a cylindrical shape 30 out of a tube 31 having a closed bottom 32 and the filler 34 of tungsten carbide particles packed together with the brazing metal. It can be seen, that in a cylindrical shape, the armor may function as a pin such as the hinge pin for a safe door or in some other similar place where pins are needed and where the pins must be drill proof.

While the sizes of the particles may be varied, of course, generally the armor would be made relatively thin, such as for example, in the form shown in FIG. 1, of an overall thickness of ½ inch, a length of about 12 inches and a height of about 1½ inches with an envelope of 18 gage steel of some high grade quality.

The tungsten carbide particles must be of a size to fit within the hollow portion of the envelope. However, particles of from minus 6 to plus 20 mesh were found to be generally most desirable for good results.

The brazing material which together with the tungsten carbide forms the filler matrix may be of any suitable brazing metal such as nickel-bronze or the like.

Other refractory hard carbides may be used in place of the tungsten carbide mentioned above. For example, the following carbides can be used: titanium carbide, zirconium carbide, hafnium carbide, vanadium carbide, niobium carbide, tantalum carbide, chromium carbide, molybdenum carbide, thorium carbide, uranium carbide, plutonium carbide.

This invention may be further developed within the scope of the following attached claims. Accordingly, it is desired that the foregoing description be read as being merely illustrative of an operative embodiment of this invention.

I now claim.

1. A drill breaking, drill-proof, double sided armor comprising a preformed steel envelope and a solidified originally fluid packing therein;

said preformed envelope having parallel thick walls, each of steel and each of sufficient thickness to form a socket upon entry of a pointed drill to prevent lateral shifting of the drill relative to the wall during drilling;

said envelope being tightly packed with a solidified originally fluid packing;

said packing comprising a fluid, self hardening mass;

said mass comprising a mixture of solid, large size, lumpy, irregular shaped particles of cemented metal carbide of approximately minus 6 to plus 20 mesh size;

said mass, while fluid, also including a fluid soft brazing metal filling the voids between the solid particles and brazing them to one another and to the walls and forming with the particles a lumpy, solid fluid self hardening packing between the walls made entirely of solid cold tightly packed cemented metal carbide particles imbedded in cold solidified brazing metal.

2. Means according to claim 1 wherein the cemented metal carbide particles are selected from the group consisting of:

titanium carbide, zirconium carbide, hafnium carbide, vanadium carbide, niobium carbide, tantalum carbide, chromium carbide, molybdenum carbide, thorium carbide, uranium carbide, plutonium carbide and tungsten carbide.

3. Means according to claim 1 wherein the cemented metal carbide particles are cemented tungsten carbide.

References Cited by the Examiner

UNITED STATES PATENTS

| 1,063,957 | 6/13 | Caters | 109—82 |
|---|---|---|---|
| 1,162,339 | 11/15 | Coolidge | 22—203 |
| 1,186,172 | 6/16 | Conlin | 22—203 |
| 1,702,766 | 2/29 | Coles et al. | 109—78 XR |
| 1,703,661 | 2/29 | Donaldson et al. | 109—78 XR |
| 1,703,662 | 2/29 | Donaldson et al. | 109—78 XR |
| 2,134,861 | 11/38 | De Voursney | 109—82 XR |
| 2,526,291 | 10/50 | Spooner | 109—82 |

FOREIGN PATENTS

| 554,856 | 8/41 | Great Britain. |
|---|---|---|
| 662,854 | 2/36 | Germany. |

HARRISON R. MOSELEY, *Primary Examiner.*

DONALD J. STOCKING, *Examiner.*